(12) United States Patent
Nammi

(10) Patent No.: US 10,484,981 B2
(45) Date of Patent: Nov. 19, 2019

(54) DECODING DOWNLINK CONTROL CHANNELS FOR 5G WIRELESS COMMUNICATION SYSTEMS

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/673,919

(22) Filed: Aug. 10, 2017

(65) Prior Publication Data

US 2019/0053200 A1    Feb. 14, 2019

(51) Int. Cl.
| | |
|---|---|
| *H04W 72/04* | (2009.01) |
| *H04B 7/06* | (2006.01) |
| *H04L 1/00* | (2006.01) |
| *H04W 76/27* | (2018.01) |
| *H04W 72/12* | (2009.01) |

(Continued)

(52) U.S. Cl.
CPC .......... *H04W 72/042* (2013.01); *H04B 7/063* (2013.01); *H04L 1/0038* (2013.01); *H04L 1/0061* (2013.01); *H04L 1/0072* (2013.01); *H04L 5/0053* (2013.01); *H04W 72/0406* (2013.01); *H04W 72/12* (2013.01);

(Continued)

(58) Field of Classification Search
CPC ........... H04W 72/0406; H04W 72/042; H04W 72/12; H04W 76/27; H04W 88/02; H04W 88/08

See application file for complete search history.

(56) References Cited

U.S. PATENT DOCUMENTS

| | | |
|---|---|---|
| 7,316,621 B2 | 1/2008 | Tufts |
| 8,989,756 B2 | 3/2015 | Shan et al. |

(Continued)

FOREIGN PATENT DOCUMENTS

| | | |
|---|---|---|
| WO | 2009074611 A2 | 6/2009 |
| WO | 2011126259 A2 | 10/2011 |

OTHER PUBLICATIONS

Zeid, et al. "Efficient Design and Implementation of LTE Downlink Control Information Decoder." International Journal of Computer Theory and Engineering 6.2, 2014, 10 pages.

(Continued)

*Primary Examiner* — Jaime M Holliday
(74) *Attorney, Agent, or Firm* — Amin, Turocy & Watson, LLP

(57) ABSTRACT

Improved downlink control information decoding is disclosed herein. Downlink control information, can be in different formats depending on the rank of transmission from the network to the user equipment device. For instance, if the transmission rank is between 1 and 4, the transmission will be a single codeword transmission, while a rank of 5-8 can have two codewords. The downlink control information can have a different format, or structure depending on the number of codewords. The user equipment device can predict whether a single codeword transmission or a multi-code codeword transmission is more likely, and attempt to decode the downlink control information using the corresponding format. If the first pass is unsuccessful, the user equipment device can make a second pass decoding based on the alternate format of downlink control information.

20 Claims, 10 Drawing Sheets

(51) Int. Cl.
*H04W 88/08* (2009.01)
*H04W 88/02* (2009.01)
*H04L 5/00* (2006.01)

(52) U.S. Cl.
CPC ............ *H04W 76/27* (2018.02); *H04W 88/02* (2013.01); *H04W 88/08* (2013.01)

(56) References Cited

U.S. PATENT DOCUMENTS

| | | |
|---|---|---|
| 9,148,256 B2 | 9/2015 | Sampath et al. |
| 9,345,021 B2 | 5/2016 | Nory et al. |
| 9,374,130 B2 | 6/2016 | Zeng et al. |
| 9,397,796 B2 | 7/2016 | Papasakellariou |
| 9,444,536 B2 | 9/2016 | Khojastepour |
| 9,456,440 B2 | 9/2016 | Ko et al. |
| 9,473,270 B2 | 10/2016 | Ko et al. |
| 9,497,006 B2 | 11/2016 | Chung et al. |
| 9,544,031 B2 | 1/2017 | Huo et al. |
| 9,544,887 B2 | 1/2017 | Kim et al. |
| 9,635,658 B2 | 4/2017 | Papasakellariou et al. |
| 9,723,626 B2 | 8/2017 | Golitschek et al. |
| 2008/0253318 A1* | 10/2008 | Malladi ............ H04L 1/0026 370/328 |
| 2009/0268840 A1* | 10/2009 | Clerckx ............ H04B 7/0417 375/267 |
| 2010/0122121 A1* | 5/2010 | Krishnamurthy ........ H04L 1/20 714/48 |
| 2012/0195271 A1* | 8/2012 | Lee ................ H04L 5/003 370/329 |
| 2012/0320863 A1* | 12/2012 | Lee ................ H04L 1/0003 370/329 |
| 2013/0083681 A1* | 4/2013 | Ebrahimi Tazeh Mahalleh ......... H04L 5/0057 370/252 |
| 2014/0198749 A1* | 7/2014 | Luo ................ H04W 72/042 370/329 |
| 2015/0222407 A1* | 8/2015 | Nammi ............ H04B 7/0413 370/336 |
| 2016/0066345 A1 | 3/2016 | Sun et al. |
| 2016/0094284 A1* | 3/2016 | Yum ............... H04B 7/0456 375/267 |
| 2018/0123647 A1* | 5/2018 | Kim ................ H04B 7/0478 |

OTHER PUBLICATIONS

Samsung, "Finalizing Layer Mapping," 3GPP Draft; R1-1710642 NR CW2L, 20170626 3rd Generation Partnership Project (3GPP), Mobile Competence Centre ; 650, route des Lucioles ; F-06921 Sophia-Antipolis Cedex ; France, Qingdao, China, Jun. 27-30, 2017, 6 pages.

International Search Report and Written Opinion dated Oct. 25, 2018 for International Application Serial No. PCT/US2018/045505, 17 pages.

\* cited by examiner

DECODING DOWNLINK CONTROL CHANNELS FOR 5G WIRELESS COMMUNICATION SYSTEMS

TECHNICAL FIELD

The present application relates generally to the field of mobile communication and, more specifically, to decoding downlink control channels in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
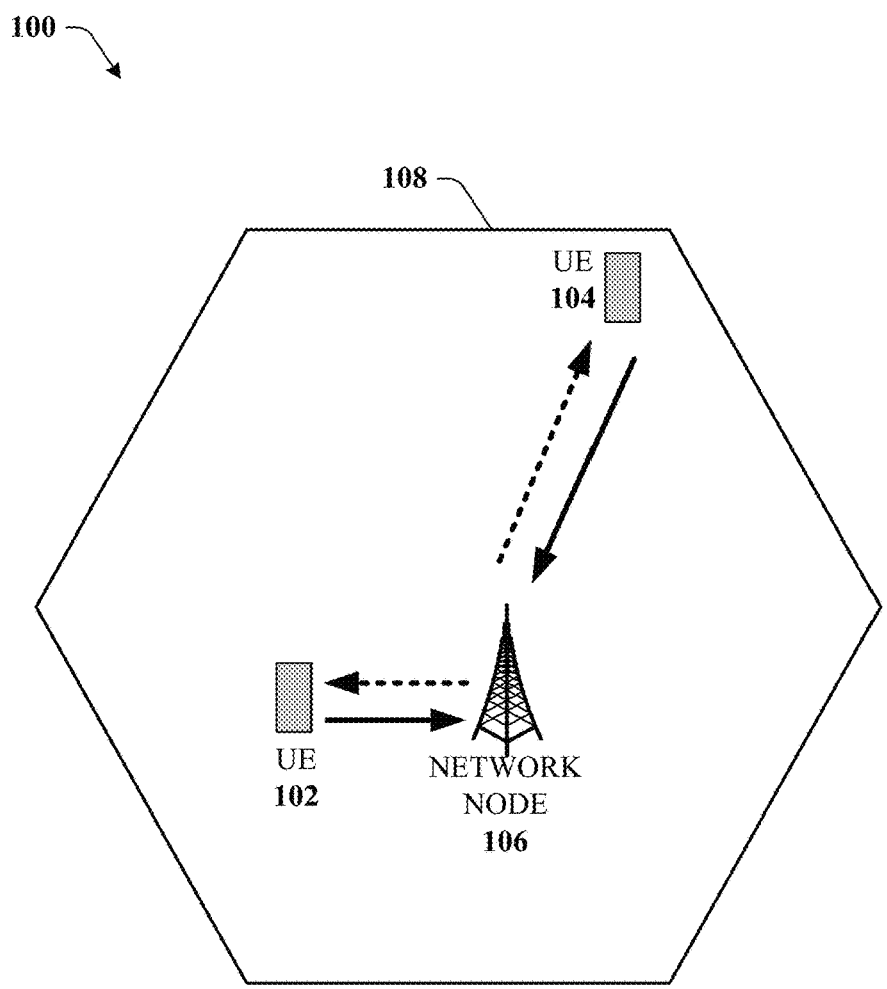
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a receiver device can comprise a processor and a memory that stores executable instructions that, when executed by the processor facilitate performance of operations. The operations can comprise receiving a transmission comprising control channel information, wherein it is unknown by the receiver device whether the transmission comprises one codeword or two codewords. The operations can also comprise determine contextual information related to the transmission to predict a number of codewords that the transmission comprises. The operations can also comprise decoding the transmission based on the number of codewords predicted.

In another embodiment, method comprises receiving, by a receiver device comprising a processor, a transmission comprising control channel information received from a transmitter, wherein a number of codewords of a data channel associated with the control channel information is unknown and the control channel information has a first structure for a single codeword data channel, and has a second structure for a multiple codeword data channel. The method can also comprise determining, by the receiver device, a probability that the data channel is the single codeword data channel. The method can also comprise decoding, by the receiver device, the transmission based on the first structure in response to the probability being at least fifty percent.

In another embodiment machine-readable storage medium, comprising executable instructions that, when executed by a processor of a device, facilitate performance of operations. The operations can comprise receiving a transmission comprising control channel information, wherein the control channel information comprises a number of codewords that is either one codeword or two codewords. The operations can also comprise determining contextual information related to the transmission to determine a predicted number for the number of codewords associated with a data channel transmission. The operations can also comprise decoding the transmission based on the predicted number.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for improved downlink control information decoding. Downlink control information, can be in different formats depending on the rank of transmission from the network to the user equipment device. For instance, if the transmission rank is between 1 and 4, the transmission will be a single codeword transmission, while a rank of 5-8 can have two codewords. The downlink control information can have a different format, or structure depending on the number of codewords. The user equipment device can predict whether a single codeword transmission or a multiple codeword transmission is more likely, and attempt to decode the downlink control information using the corresponding format. If the first pass is unsuccessful, the user equipment device can make a second pass decoding based on the alternate format of downlink control information.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In an embodiment UE 102 and UE 104 can receive downlink control information from network node 106. Depending on the signal to interference plus noise ratio (SINR) of transmissions and other relevant conditions between the network node 106 and the UE devices 102 and 104, the data channel transmissions can be of various ranks that have a corresponding number of layers.

For traditional multi-codeword MIMO communications, the feedback channel (both downlink and uplink) overhead is proportional to the transmission rank. For example if the UE reported rank is equal to four, then the receiver reports four channel quality indicators, similarly the transmitter needs to transmit information relating to four transport block sizes, modulation formats, HARQ process numbers, redundancy versions and etc. Hence the feedback channel overhead is proportional to the transmission rank. For reducing the overhead, the codeword dimensioning principle was proposed in LTE to bundle the layers and supports up to two layers per codeword. Where the codeword is defined as an information block appended with a CRC. Each codeword is separately coded using turbo coding and the coded bits from each codeword are scrambled separately. The complex-valued modulation symbols for each of the codewords to be transmitted are mapped onto one or multiple layers. The complex-valued modulation symbols $d^{(q)}(0), \ldots, d^{(q)}(M^{(q)}_{symb}-1)$ for code word q are mapped onto the layers $x(i)=[x^{(0)}(i) \ldots x^{(v-1)}(i)]^T, i=0, 1, \ldots, M^{layer}_{symb}-1$, where v is the number of layers and $M^{layer}_{symb}$ is the number of modulation symbols per layer. In LTE, whenever the transmission rank is more than two, the transport block size is increases to accommodate higher numbers of bits.

For rank one through four communications, the network node 106 can transmit one codeword that comprises the data on 1-4 layers. For rank five through eight transmissions, the network node 106 can transmit the data via two codewords. The DCI format selected to the schedule and facilitate the data channel transmissions can be different depending on the number of layers involved, or based on the number of codewords.

In traditional systems, the receiver would not know which format the DCI was sent in before attempting to decode, and so would then sequentially attempt to decode the DCI based on a first format, and if the cyclic redundancy check bits passed, then an acknowledgement (ACK) would be sent. If the cyclic redundancy check bits did not pass, then the next DCI format would be used to decode the DCI.

In the current embodiment, in order to save time and computing resources, the user equipment (e.g., 102 and/or 104) can predict how many codewords will be used to transmit the data channel, and use the corresponding DCI format to decode the control channel transmission on the first pass, thus increasing the likelihood of successfully decoding the DCI on the first attempt. If the decoding is successful, the UE 102 or 104 can follow the convention procedure for reporting ACK/NAK. If the decoding is unsuccessful, based on a review of the cyclic redundancy check bits, then the other DCI format can be used to decode the DCI. And if the second pass is successful, then the UE 102 or 104 can follow the convention ACK/NAK procedure, but if it is unsuccessful, then the UE 102 or 104 can assume that it is not scheduled by the network.

Figure 2:
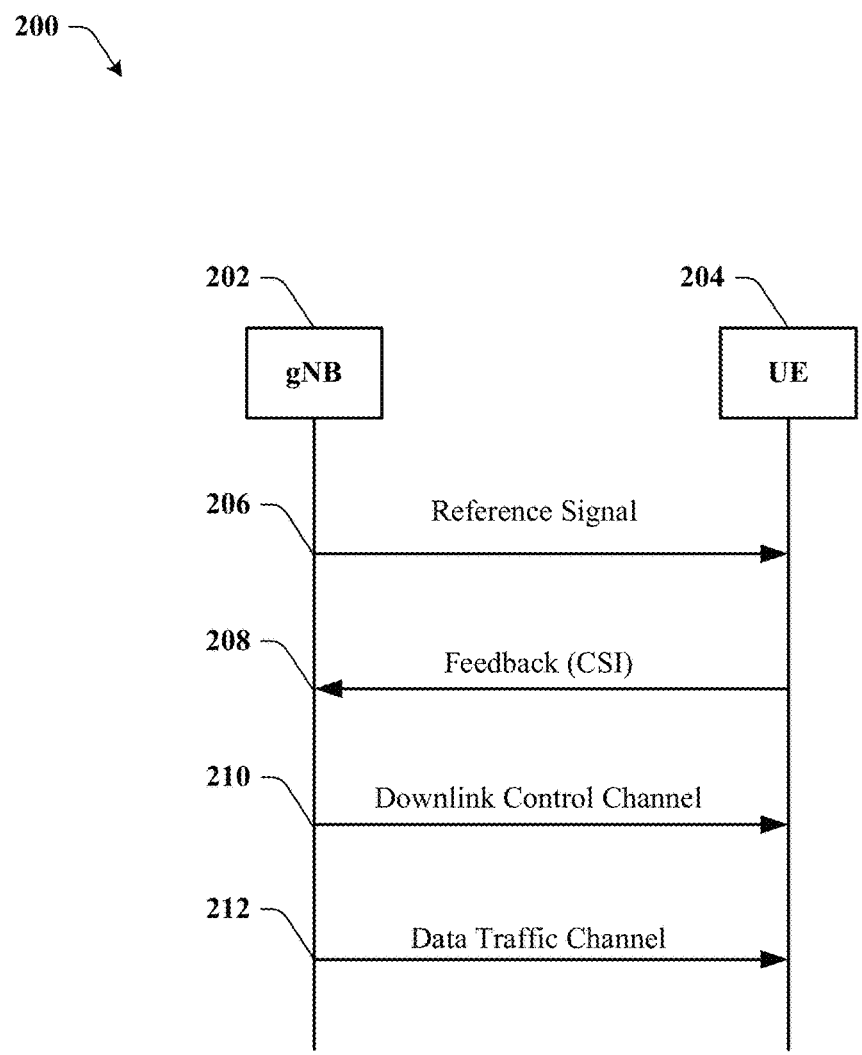
FIG. 2 illustrates an example block diagram of a message sequence chart in accordance with various aspects and embodiments of the subject disclosure.

Turning now to FIG. 2, illustrated is an example block diagram of a message sequence chart 200 in accordance with various aspects and embodiments of the subject disclosure.

The message sequence chart 200 can be between a gNodeB 202 and a UE 204 within the gNodeB 202 cell. The gNodeB 202 can send a reference signal 206 (CSI-RS) to the UE 204. The reference signal 206 can be a pilot signal that is cellular specific or UE specific and is used by the UE 204 to acquire channel-state information (CSI) and beam specific information (beam RSRP). In 5G wireless networks, the CSI-RS is UE specific so it can have a significantly lower time/frequency density. The reference signal 206 can also include demodulation reference signals that are intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

The UE 204 can send back a feedback signal 208 that comprises channel state information determined from the reference signal(s) 206. The channel state information can include a channel quality indicator, precoding matrix, rank information, and resource indicator (beam indicator). The rank indicator can indicate the number of layers that are supportable in transmissions between the gNodeB 202 and the UE 204. For instance, when the SINR is low, due to a function of low power, a large distance between the devices, path loss, and/or other interference, the rank indicator can be 1, indicating that only one layer can be supported. In other embodiments, when the SINR is high, the Rank can be two or four or higher, indicating that multiple data layers can be supported, allowing MIMO communications between the gNodeB 202 and the UE 204.

In an embodiment, the downlink control channel 210 (Physical Downlink Control Channel—"PDCCH") comprises information about scheduling grants, which comprises number of MIMO layers scheduled, transport block sizes, modulation for each codeword, parameters related to HARQ, sub band locations and also PMI corresponding to that sub bands as well as redundancy version information. Note that, all downlink control information (DCI) formats may not use transmit all the information as shown above, In general the contents of PDCCH depends on transmission mode and DCI format. Depending one the rank of the data traffic channel 212 from the gNodeB 202 to the UE 204, the format of the DCI can be different, as different types of information will be sent depending on whether the transmission is a single codeword transmission or multiple codeword transmission.

Hence two sets of control channels are needed for conveying the scheduling information from the network to the UE 204. However, since the UE 204 does not know the number of layers scheduled as this information is part of the downlink control channel 210, the UE has to decode the two sets of control channels to check whether it is scheduled or not. It can be observed that decoding two control channels is inefficient scheme as the number of computational resources are wasted. Hence an efficient solution is needed to decode control channel 210 with multi antenna wireless communication systems.

Accordingly, the UE 204 can determine a probability that the gNodeB 202 will be using a DCI format corresponding to either the single codeword transmission or multiple codeword transmission, and attempt to decode the higher probability DCI format first. If the attempt is successful, the UE 204 can send back the ACK/NAK to the gNodeB 202 as appropriate and receive the data traffic channel 212. If the attempt is unsuccessful, then the UE 204 can decode the DCI 210 using the alternate format.

Figure 3:
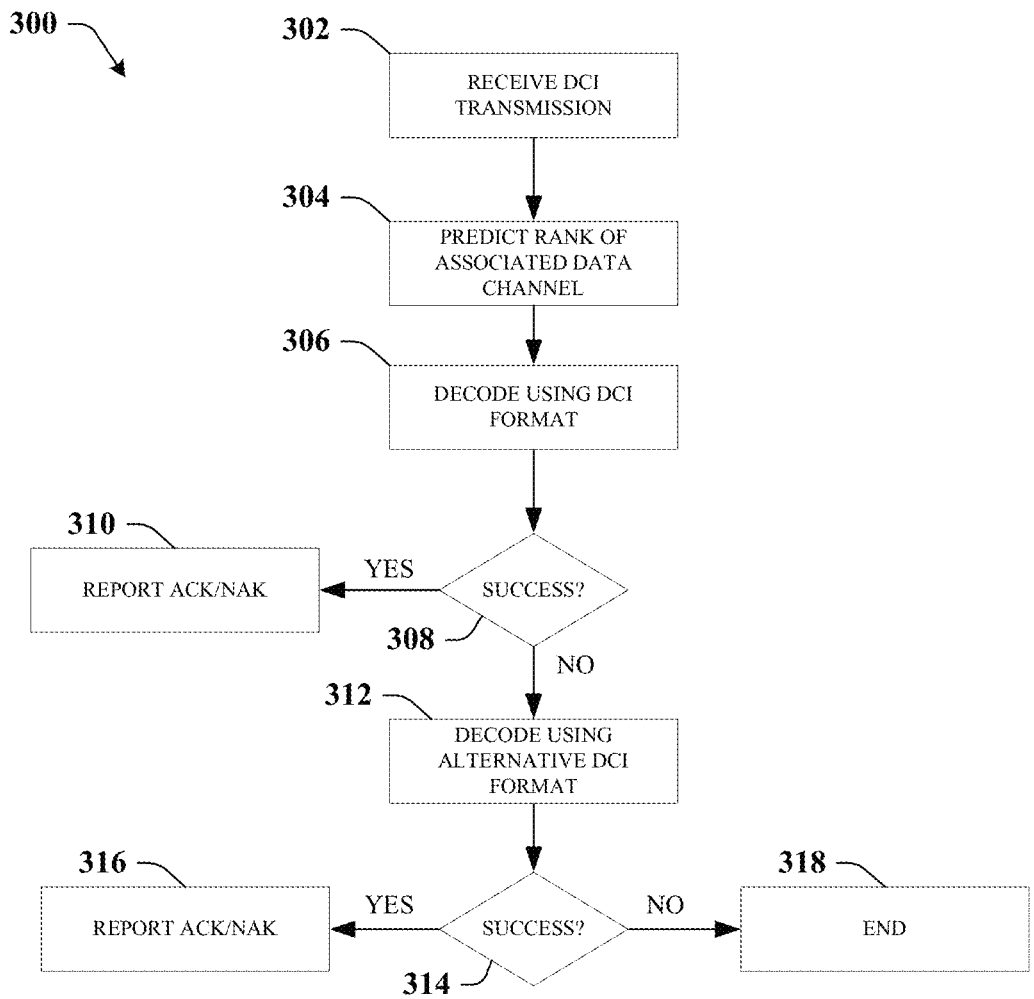
FIG. 3 illustrates an example flowchart for predicting a format of a downlink control channel in accordance with various aspects and embodiments of the subject disclosure.

Turning now to FIG. 3, illustrated is an example flowchart for predicting a format of a downlink control channel in accordance with various aspects and embodiments of the subject disclosure. At 302 the UE receives a downlink control information transmission (e.g., on a Physical Downlink Control Channel PDCCH). In order to schedule a subsequent data traffic channel, the UE should decode the DCI transmission in order to learn the scheduling parameters, and other parameters affiliated with preparing to receive the data traffic.

At 304, the UE can predict the rank of the associated data channel By predicting the rank, the UE can determine the likelihood that the data traffic transmission will be sent using either a single codeword or a two codeword transmission. Depending on the rank/layer of the transmission, the DCI will be in different formats or structures due to the different types of information needed to schedule and facilitate the data traffic transmission.

The UE can predict the rank of the associated data channel using a variety of parameters including, but not limited to location of the UE relative to the transmitter/network node, the rank reported by the UE (e.g., in the channel state information), the number of layers and/or codewords scheduled in past time intervals, the network indication about the maximum number of layers or codewords, or a combination of the parameters, with different weighting functions applied to each of the parameters. For instance, the network indication about the maximum number of layers can supersede other parameters, and the rank reported by the UE can have higher weighting than the previous layers/codewords.

Location of the UE:

One criterion for determining first pass DCI is to identify the location of the UE in the cell. For example when the UE is nearer to the Node B it will choose the two codeword as the first pass DCI. This is because at the cell center the UE generally reports a high rank. Note that there are several methods to identify the UE location from gNode B. For example using GPS measurements, using the measured CQIs, using the mobility measurement reports etc. The size of the NCL is an indication whether the UE is at the cell center or not.

Rank Reported by the UE:

Another criterion for determining first pass DCI is based on the rank reported by the UE during CSI reporting over a period of time. This is because, say if the UE reports rank is less than 5 over a period of time, it is unlikely that the network schedules the UE with rank greater than 4.

Number of Layers/CW Scheduled in the Past Time Intervals:

This criterion is similar to the above. In this case, the UE monitors the number of layers scheduled over a period of time and decides about the first pass DCI. This is because, it is unlikely that the network schedules the UE with high rank if the number of layers scheduled for this particular UE are low.

Indication from the Network about the Maximum Number of Layers:

Another criterion for determining first pass DCI is to if the UE receives a signalling from network about the maximum number of layers or maximum number of codewords it can expect. For example, the network can indicate the UE should expect maximum 1 CW. In this case, the UE will decode single codeword DCI and determines whether it is scheduled or not.

At 306, after determining which format the DCI most likely to be in, the UE can decode the DCI based on the determined format. If it is a success at 308, then the UE can report the ACK/NAK at 310 according to conventional procedures to begin facilitating the data traffic channel. If it is not a success, then the UE can decode using the alternate format at 312. For instance, if the UE determines that the transmission is likely to be a single codeword transmission (e.g., rank 1-4) then the UE can attempt to make a first pass using the DCI format corresponding to rank 1-4 transmissions. If that fails, then the UE can attempt to decode the DCI using the DCI format corresponding to rank 5-8 transmissions (two codewords). The UE can determine whether the decoding of the DCI was successful by checking the cyclic redundancy check bits appended to the DCI transmission.

If the second pass decoding at 312 is successful at 314, then the UE can report the ACK/NAK at 316. If it is unsuccessful at 318, then the UE can determine that the UE was not scheduled for that time frame, and wait for a new DCI transmission in a new time frame.

Figure 4:
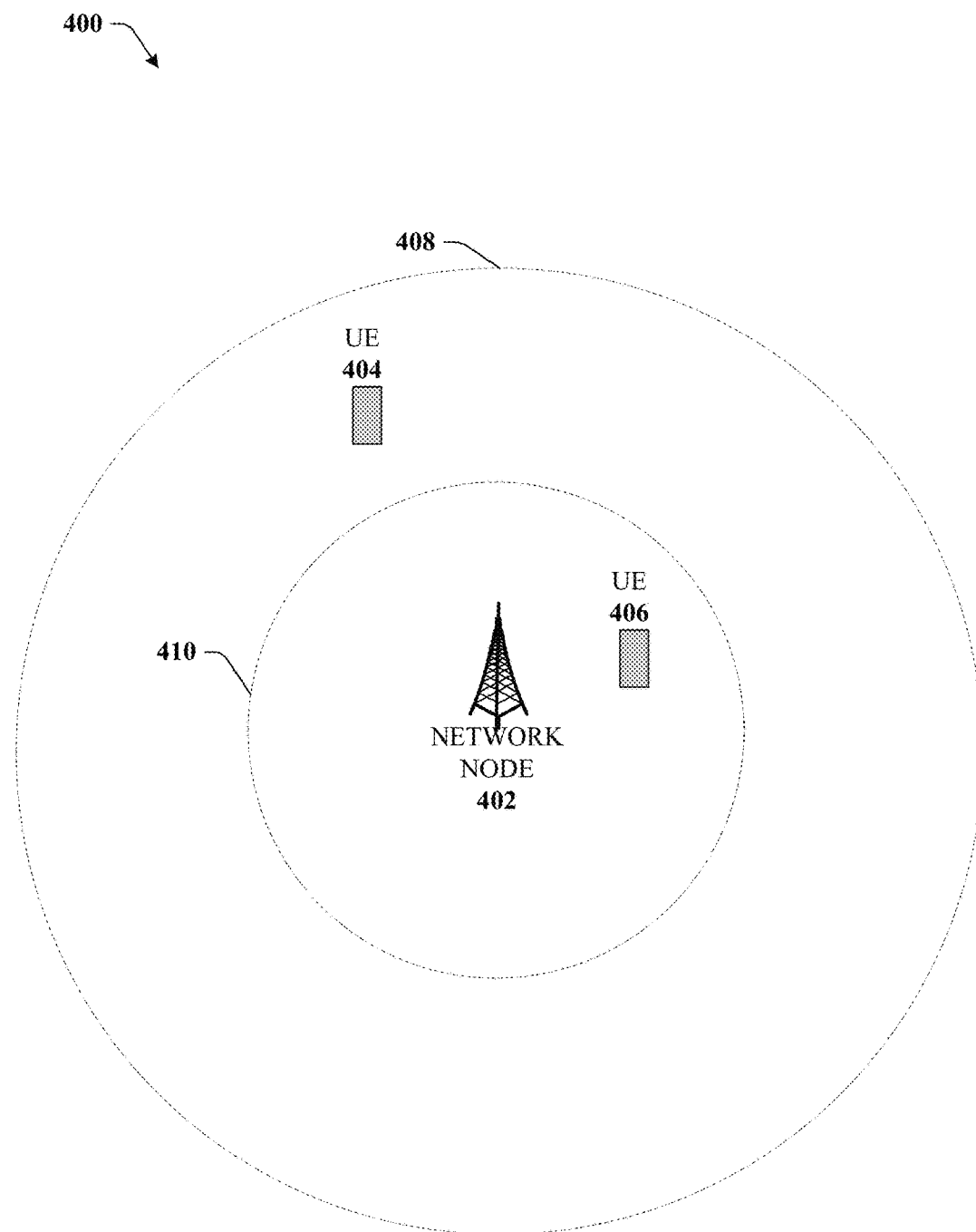
FIG. 4 illustrates an example block diagram showing downlink control information format and location in accordance with various aspects and embodiments of the subject disclosure.

Turning now to FIG. 4, illustrated is an example block diagram 400 showing downlink control information format and location in accordance with various aspects and embodiments of the subject disclosure. In the embodiment, shown in FIG. 4, UE 406 and UE 404 can determine which format to decode the DCI received from network node 402 based on the location in which they are in relative to the network node 402.

In an embodiment, transmissions are likelier to be higher rank if the signal to interference plus noise ratio of a channel is higher, and so UEs that are closer to the network node 402 will be more likely to receive data traffic channels that are sent from the network node 402 using multiple codeword transmissions. Accordingly, in an embodiment, UE 406 which is within a range 410 of the network node 402 will have probability above 50% that that DCI will be in a format corresponding to a multiple codeword transmission, and thus the first pass will use the multi-codeword DCI format. By contrast, UE 404 which is outside the range 410, but within range 408, will use the DCI format corresponding to a single codeword transmission to decode the DCI received from network node 402.

It is to be appreciated that the ranges 410 and 408 are not fixed, and can change depending on the transmit power of the network node 402, interference from other network nodes and UEs, obstructions between the network node 402 and UE devices (e.g., buildings, trees, topography, etc). In some embodiments, the range 410 can vary depending on which direction the UE is in from the network node 402. The distances can be determined based on the measured SINR values received from the UE devices.

Figure 5:
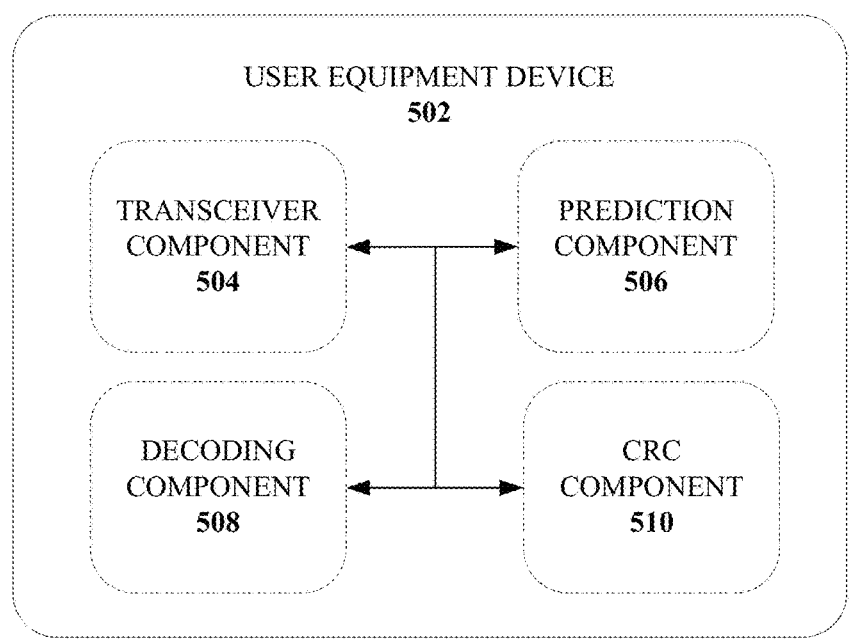
FIG. 5 illustrates an example block diagram of a user equipment device system in accordance with various aspects and embodiments of the subject disclosure.
Figure 6:
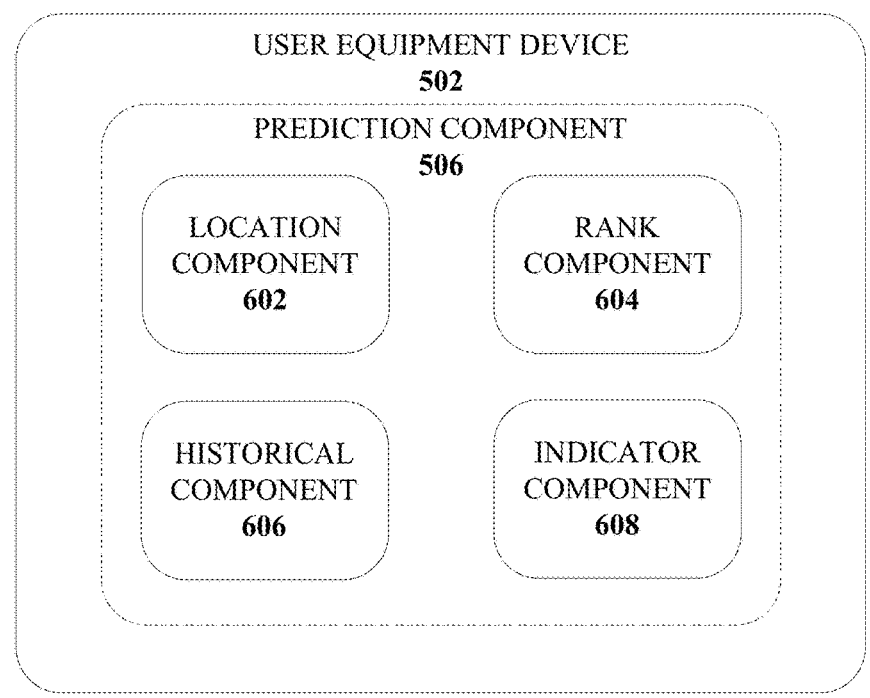
FIG. 6 illustrates an example block diagram of a user equipment device system in accordance with various aspects and embodiments of the subject disclosure.

Referring now to FIG. 5 and FIG. 6, illustrated are example block diagrams 400 and 500 of a user equipment device 502 in accordance with various aspects and embodiments of the subject disclosure showing how the UE device can improve the DCI decoding performance in a wireless communications system.

User equipment device 502 can include a transceiver component 504 that receives a downlink control transmission comprising control channel information, wherein it is unknown whether a data channel transmission associated with the control channel information comprises one or two codewords. The downlink control transmission can be received in order to facilitate the transceiver component 504 receiving the subsequent data channel transmission.

A prediction component 506 can determine contextual information related to the data channel transmission to predict a number of codewords that the data channel transmission comprises. The contextual information can include information relating the location of the user equipment device 502, or a rank reported by the user equipment device 502 in the channel state information, or a number of layers/codewords scheduled in data channel transmissions in previous time intervals, or based on the network indication about the maximum number of layers or codewords, or some combination thereof.

Once the prediction component 506 determines the most likely rank or number of codewords in the data channel transmission, the decoding component 508 can decode the downlink control information using the format associated with the prediction. The CRC component 510 can check the CRC bits appended to the downlink control information to ensure that the decoding performed by the decoding component 508 was successful. If it was unsuccessful, then the decoding component 508 can decode the downlink control information again, using the alternate format.

Turning now to FIG. 6, illustrated is an example block diagram 600 of a user equipment device 502 in accordance with various aspects and embodiments of the subject disclosure. In FIG. 6, shown are some of the respective components of the prediction component 506.

In particular, a location component 602 can be provided to estimate the likelihood of the downlink control information being in a format associated with a single codeword or multiple codeword based on the location of the user equipment device 502. In an embodiment, the location component 602 can determine the location of the user equipment device 502 based on the relative SINR of a reference signal received from a network node. In other embodiments, the location can be explicit, determined from global positioning satellite receivers on the user equipment device 502 or based on network location determination using multilateration or other location determination algorithms In an embodiment, the user equipment device 502 can determine whether it is within a predetermined range of a network node, or within a geofence area defined by the network node or mobile network.

In an embodiment, a rank component 604 can be provided to determine a rank reported by the user equipment device 502 during channel state information reporting in response to receiving the reference signal. This is because, say if the UE reports rank is less than 5 over a period of time, it is unlikely that the network schedules the UE with rank greater than 4 at the current time.

In another embodiment, the prediction component 506 can include a historical component 606 that monitors the number of layers scheduled over a period of time and decides about the first pass DCI. This is because, it is unlikely that the network schedules the UE with high rank if the number of layers scheduled for this particular UE are low. In an embodiment, the period of time in which the historical component 606 monitors the history can be determine by the mobile network, or can change in response to various other environment concerns. For instance, the historical component 606 can use a shorter length of time in which to determine the predicted rank if the user equipment device 502 is moving, or is near the edge of a cell. The length of time polled by the historical component can decrease in an inverse relationship to the speed of the user equipment device 506.

In an embodiment, the prediction component 506 can also include an indicator component 608 that can monitor the mobile network and determine whether the mobile network has set a maximum allowed rank. For instance, if the mobile network has determine that the maximum rank is 4, then the indicator component 608 can determine that the decoding component 508 should decode the downlink control information using the format corresponding to a single codeword. Similarly, the indicator component 608 can determine whether the network has set a minimum rank (e.g., 5) and so the decoding component 508 will decode the downlink control information using the format corresponding to multiple codewords.

In an embodiment, the prediction component 506 can weight each of the predictions using different weightings that are static or change over time. For instance, the indicator component 608 determinations can be ranked higher and/or carry more weight than the location component 602 determinations. Likewise, the location component 602 predictions can be weighted differently depending on how near to a transition point (e.g., crossing boundary 410) the user equipment device 502 is or based on the speed of the user equipment device 502.

Figure 7:
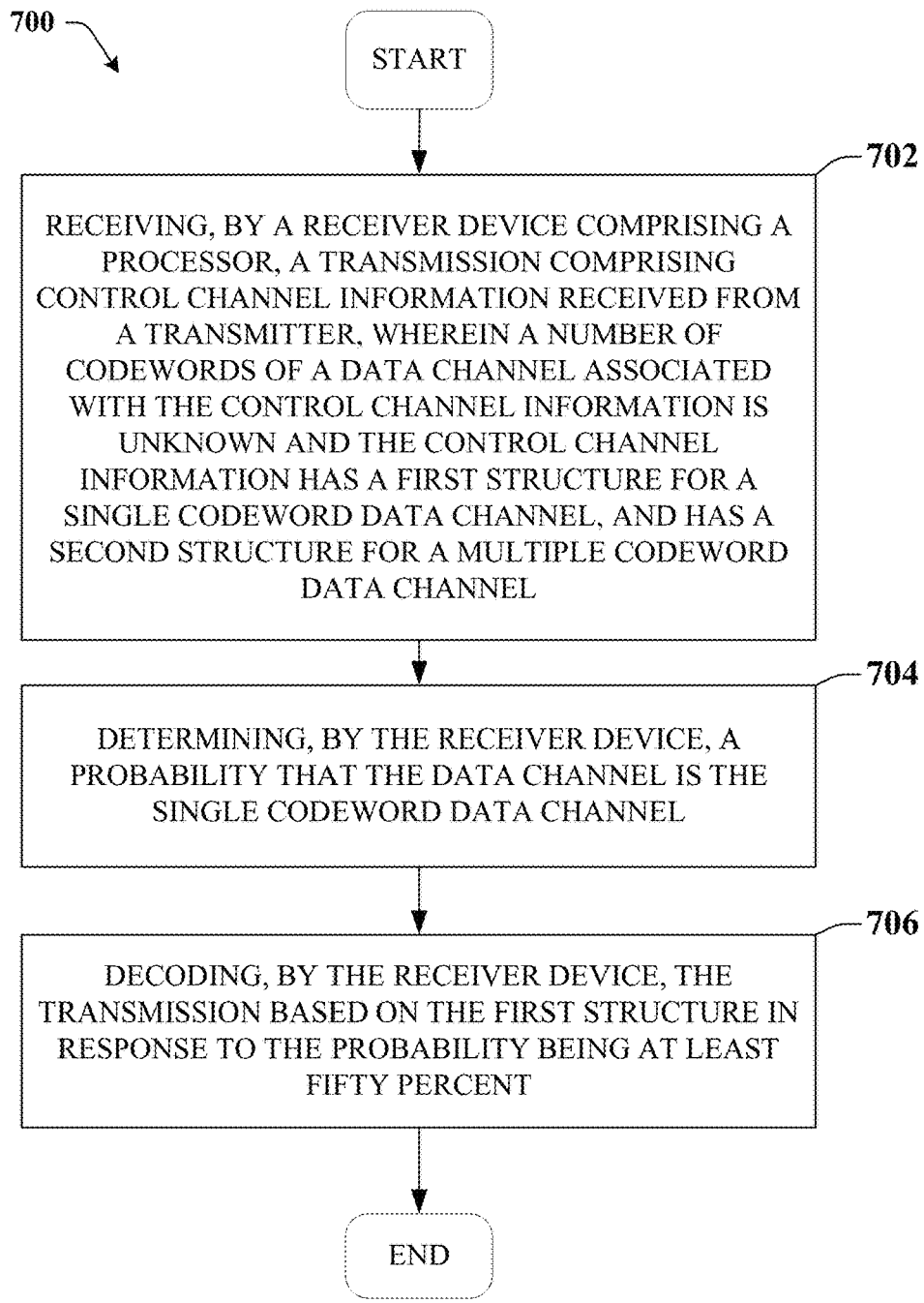
FIG. 7 illustrates an example method for decoding downlink control information in accordance with various aspects and embodiments of the subject disclosure.
Figure 8:
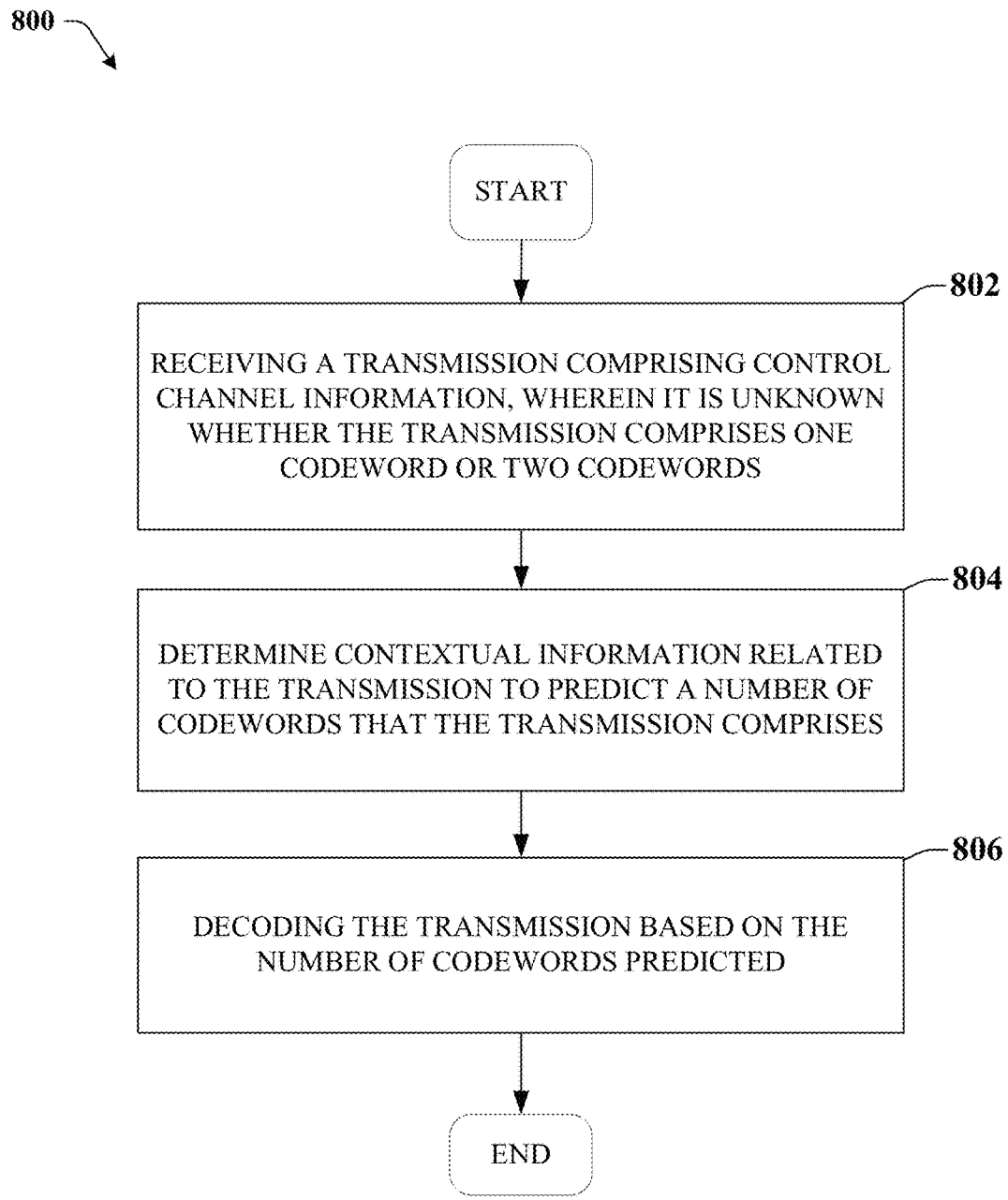
FIG. 8 illustrates an example method for decoding downlink control information in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for decoding downlink control information in accordance with various aspects and embodiments of the subject disclosure.

Method 700 can start at 702, where the method comprises receiving, by a receiver device comprising a processor, a transmission comprising control channel information received from a transmitter, wherein a number of codewords of a data channel associated with the control channel information is unknown and the control channel information has a first structure for a single codeword data channel, and has a second structure for a multiple codeword data channel.

At 704 the method comprises de determining, by the receiver device, a probability that the data channel is the single codeword data channel.

At 706, the method comprises decoding, by the receiver device, the transmission based on the first structure in response to the probability being at least fifty percent.

FIG. 8 illustrates an example method 800 for decoding downlink control information in accordance with various aspects and embodiments of the subject disclosure.

Method 800 can start at 802, where the method comprises receiving a downlink control transmission comprising control channel information, wherein it is unknown whether a data channel transmission associated with the control channel information comprises one codeword or two codewords.

At 804 the method comprises determining contextual information related to the data channel transmission to predict a number of codewords that the data channel transmission comprises.

At 806, the method comprises decoding the downlink control transmission based on the number of codewords predicted.

Figure 9:
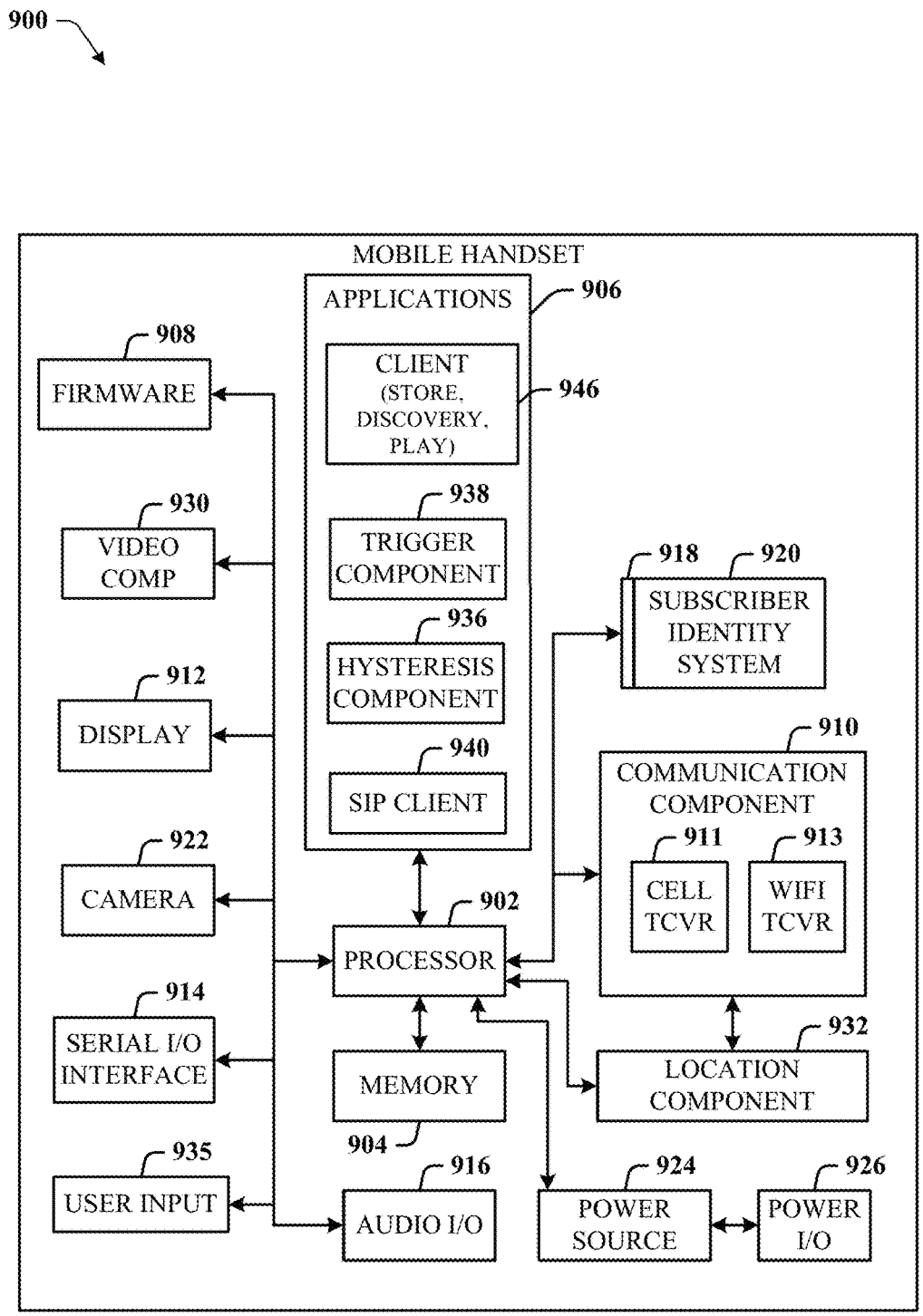
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
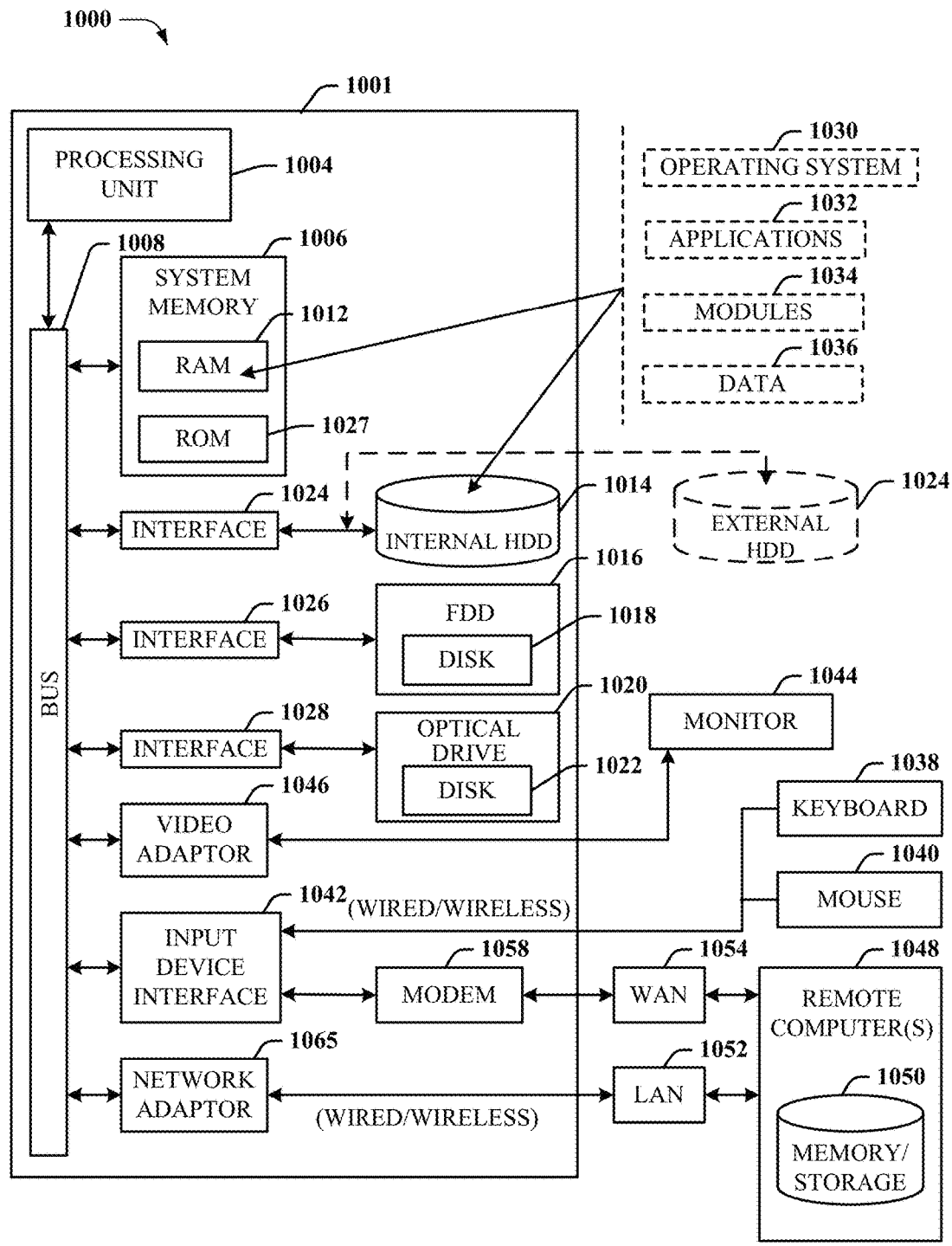
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A receiver device, comprising:
a processor; and
a memory that stores executable instructions that, when executed by the processor, facilitate performance of operations, comprising:
receiving a downlink control transmission comprising control channel information that facilitates scheduling a subsequent data channel transmission, wherein it is unknown by the receiver device whether the subsequent data channel comprises one codeword or two codewords;
determining contextual information related to the subsequent data channel transmission, based on a previous data channel transmission, wherein the contextual information comprises a location of the receiver device relative to a network node device;
predicting a number of codewords that the subsequent data channel transmission comprises based on the contextual information, resulting in a predicted number of codewords, wherein the predicting comprises determining a probability that the number of codewords is two, the determining the probability comprising determining whether the location of the receiver device relative to the network node device is within a defined range; and
decoding the downlink control transmission based on the predicted number of codewords.

2. The receiver device of claim 1, wherein the operations further comprise:
in response to successfully decoding the downlink control transmission based on the predicted number of codewords, decoding a data channel based on the control channel information.

3. The receiver device of claim 1, wherein the predicted number of codewords is a first number of codewords, and wherein the operations further comprise:
in response to unsuccessfully decoding the downlink control transmission based on the first number of codewords, decoding the downlink control transmission based on a second number of codewords different than the first number of codewords.

4. The receiver device of claim 1, wherein the defined range is determined based on at least one of a transmission power of the network node device or an interference from other network node devices other than the network node device.

5. The receiver device of claim 1, wherein the contextual information comprises a rank indicator reported by the receiver device.

6. The receiver device of claim 1, wherein the contextual information comprises a historical number of codewords in a previous data channel transmission prior to the subsequent data channel transmission.

7. The receiver device of claim 1, wherein the contextual information comprises a network indication of a maximum number of layers.

8. The receiver device of claim 1, wherein the number of codewords is one and a number of layers associated with the data channel transmission is at most four.

9. The receiver device of claim 1, wherein the number of codewords is two and a number of layers associated with the subsequent data channel transmission is at least five.

10. A method, comprising:
receiving, by a receiver device comprising a processor, a transmission comprising control channel information received from a transmitter, wherein the control channel information facilitates configuration of a data channel and wherein a number of codewords of the data channel associated with the control channel information is unknown and the control channel information has a first structure for a single codeword data channel, and has a second structure for a multiple codeword data channel;
determining, by the receiver device, contextual information associated with a previous data channel transmission, wherein the contextual information comprises a location of the receiver device relative to the transmitter;
predicting, by the receiver device, the number of codewords for the data channel based on the contextual information, wherein the predicting comprises determining a probability that the number of codewords is one based on a result of determining whether the location of the receiver device relative to the transmitter is within a defined range, and
decoding, by the receiver device, the transmission based on the first structure in response to the probability being determined to be at least fifty percent.

11. The method of claim 10, further comprising:
in response to the decoding the transmission based on the first structure failing, decoding, by the receiver device, the transmission based on the second structure.

12. The method of claim 11, wherein, in response to the decoding the transmission based on the second structure failing:
determining, by the receiver device, that the receiver device is not scheduled by a network device of a mobile network.

13. The method of claim 10, further comprising:
decoding, by the receiver device, the transmission based on the second structure in response to the probability being determined to be below fifty percent.

14. The method of claim 13, further comprising:
in response to the decoding the transmission based on the second structure failing, decoding, by the receiver device, the transmission based on the first structure.

15. The method of claim 10, wherein the defined range is dynamically determined based on a transmission power of the transmitter or an interference from other transmitters other than the transmitter.

16. The method of claim 10, wherein the single codeword data channel corresponds to a transmission with a rank of four or less.

17. The method of claim 10, wherein the multiple codeword data channel corresponds to a transmission with a rank of five or higher.

18. A non-transitory machine-readable storage medium, comprising executable instructions that, when executed by a processor of a device, facilitate performance of operations, comprising:
receiving a transmission comprising control channel information that facilitates configuring a subsequent data channel transmission, wherein a receiver device of the transmission comprises no information about whether the subsequent data channel transmission comprises one codeword or two codewords;

determining contextual information related to the transmission, wherein the contextual information comprises a location of a receiver device of the transmission relative to a network node device, and the contextual information is based on a former data channel transmission;

predicting a number of codewords associated with the subsequent data channel transmission based on the contextual information, wherein the predicting comprises determining a probability that the number of codewords is two based on a result of determining whether the location of the receiver device relative to the network node device is within a defined range; and decoding the transmission based on the number of codewords.

19. The non-transitory machine-readable storage medium of claim 18, wherein the operations further comprise:

in response to successfully decoding the transmission based on the number of codewords, decoding the subsequent data channel transmission based on the control channel information.

20. The non-transitory machine-readable storage medium of claim 18, wherein the operations further comprise:

in response to unsuccessfully decoding the transmission based on the number of codewords, decoding the transmission based on a different number of codewords than the number of codewords.

* * * * *